(12) United States Patent
Hasegawa et al.

(10) Patent No.: US 6,644,274 B2
(45) Date of Patent: Nov. 11, 2003

(54) APPARATUS FOR DETECTING A CONDITION OF BURNING IN AN INTERNAL COMBUSTION ENGINE

(75) Inventors: Jun Hasegawa, Kariya (JP); Yoshinori Maegawa, Oobu (JP); Yoshihiro Majima, Inuyama (JP)

(73) Assignee: Denso Corporation, Kariya (JP)

( * ) Notice: Subject to any disclaimer, the term of this patent is extended or adjusted under 35 U.S.C. 154(b) by 127 days.

(21) Appl. No.: 09/984,554

(22) Filed: Oct. 30, 2001

(65) Prior Publication Data

US 2002/0050271 A1 May 2, 2002

(30) Foreign Application Priority Data

Nov. 1, 2000 (JP) ........................................ 2000-334609

(51) Int. Cl.[7] ................................................. F02P 5/00
(52) U.S. Cl. ........................... 123/406.41; 123/406.45; 123/406.26; 123/406.24
(58) Field of Search ............... 123/406.45, 406.22, 123/406.24, 406.25, 406.26, 406.27, 406.28, 406.41, 406.42, 406.43, 406.59, 90.11, 90.15

(56) References Cited

U.S. PATENT DOCUMENTS

| | | | | |
|---|---|---|---|---|
| 4,116,473 A | * | 9/1978 | Creus | ............................ 285/5 |
| 4,257,373 A | * | 3/1981 | McDougal et al. | ...... 123/406.2 |
| 5,085,192 A | * | 2/1992 | McDougal et al. | ...... 123/406.2 |
| 5,604,303 A | | 2/1997 | Tomisawa et al. | |

FOREIGN PATENT DOCUMENTS

| | | |
|---|---|---|
| JP | 7-119530 | 5/1995 |
| JP | 7-119531 | 5/1995 |
| JP | 11-315741 | 11/1999 |

* cited by examiner

Primary Examiner—John Kwon
(74) Attorney, Agent, or Firm—Nixon & Vanderhye P.C.

(57) ABSTRACT

An apparatus for detecting a condition of the burning in an internal combustion engine includes a burning-parameter controlling device for controlling a burning parameter operating on the burning in the internal combustion engine. A burning-condition detecting device operates for, in cases where the burning parameter is changed by the burning-parameter controlling device, sampling prescribed information for detecting a burning condition.

12 Claims, 12 Drawing Sheets

APPARATUS FOR DETECTING A CONDITION OF BURNING IN AN INTERNAL COMBUSTION ENGINE

BACKGROUND OF THE INVENTION

1. Field of the Invention

This invention relates to an apparatus for detecting a condition of the burning in an internal combustion engine.

2. Description of the Related Art

It is known to detect a condition of the burning in an internal combustion engine on the basis of the rotational speed of the engine. In general, a timing of the detection of a burning condition is set to a fixed crank angle. At this detection timing, the rotational speed of the engine is calculated. Also, it is known to detect a condition of the burning in an internal combustion engine on the basis of the pressure within a cylinder of the engine.

A typical internal combustion engine has an exhaust passage provided with a catalytic converter for reducing harmful emission. The catalytic converter becomes sufficiently active when being warmed up.

There is a known technique for quickly warming up a catalytic converter after an engine is started. The known technique has a step of greatly retarding a spark timing (an ignition timing) from normal one after the start of the engine. The retardation of the spark timing causes a greater amount of energy (unburned gas) escaping from cylinders to an exhaust passage, an increase in the temperature of exhaust gas, and the burning of unburned gas in the exhaust passage which warm up the catalytic converter.

In an internal combustion engine, the crank-angle timing of the burning depends on the spark timing. In cases where the rotational speed of the engine is calculated at a timing of a fixed crank angle independent of the spark timing, the calculated engine speed tends to be lower in accuracy for the detection of a burning condition when the spark timing is greatly regarded from normal one.

Japanese patent application publication number 11-315741 discloses an ignition timing controller of an internal combustion engine which is capable of suppressing the generation of carbon monoxide (CO), hydrocarbon (HC), and others in the exhaust gas while improving a catalytic-converter warm-up efficiency after the start of the engine. The controller in Japanese application 11-315741 includes an ECU (electronic control unit). After the start of the engine, the ECU retards the ignition timing to quickly warm up a catalytic converter. The ECU cancels the retardation of the ignition timing after the fuel injection rate determined by air-to-fuel ratio feedback control changes from an increased value to a decreased value.

U.S. Pat. No. 5,604,303 corresponding to Japanese patent application publication number 7-119530 discloses a combustion condition detecting system of an internal combustion engine. The system in U.S. Pat. No. 5,604,303 includes a first device for detecting the pressure in a cylinder of the engine, a second device for setting an integral range in a crankshaft angle in accordance with a rotation speed of the engine, a third device for integrating the pressure within the integral range thereby to derive an integrated value, a fourth device for judging whether or not an abnormal combustion occurs in the cylinder by comparing the integrated value with a reference value, and a fifth device for issuing an alarm when the fourth device judges the occurrence of the abnormal combustion. In a lower engine speed side near the idling speed, the integral range is set to appear after a given crank angle position where the pressure in the cylinder exhibits the maximum.

Japanese patent application publication number 7-119531 discloses an apparatus for detecting a condition of the burning in an internal combustion engine. The apparatus in Japanese application 7-119531 includes an in-cylinder pressure sensor for detecting the pressure within a cylinder of the engine. The detected in-cylinder pressure is integrated for a specified crank-angle interval "A" after ignition. The after-ignition integration-result value is denoted by SA. In addition, the detected in-cylinder pressure is integrated for a specified crank-angle interval "B" before ignition. The before-ignition integration-result value is denoted by SB. The value SB is subtracted from the value SA to calculate the difference ΔS (=SA−SB). The difference ΔS is compared with a reference value. When the difference ΔS is smaller than the reference value, it is decided that abnormally burning (for example, misfire) occurs.

SUMMARY OF THE INVENTION

It is an object of this invention to provide an apparatus for accurately detecting a condition of the burning in an internal combustion engine even when the crank-angle timing of the burning is changed.

A first aspect of this invention provides an apparatus for detecting a condition of the burning in an internal combustion engine. The apparatus comprises burning-parameter controlling means for controlling a burning parameter operating on the burning in the internal combustion engine; and burning-condition detecting means for, in cases where the burning parameter is changed by the burning-parameter controlling means, sampling prescribed information for detecting a burning condition.

A second aspect of this invention is based on the first aspect thereof, and provides an apparatus further comprising a spark plug, wherein the burning parameter is a spark timing at which the spark plug generates a spark, and the burning-parameter controlling means comprises spark-timing controlling means for driving the spark plug to control the spark timing.

A third aspect of this invention is based on the first aspect thereof, and provides an apparatus further comprising a valve-timing varying mechanism, wherein the burning parameter is a timing at which an outlet valve is opened, and the burning-parameter controlling means comprises valve controlling means for controlling the timing at which the outlet valve is opened.

A fourth aspect of this invention is based on the first aspect thereof, and provides an apparatus further comprising rotational-speed detecting means for sampling information related to a rotational speed of the internal combustion engine, wherein the burning-condition detecting means comprises means for sampling the information related to the rotational speed of the internal combustion engine at a prescribed timing and in response to the burning parameter, and means for detecting the burning condition in response to the sampled information related to the rotational speed of the internal combustion engine.

A fifth aspect of this invention is based on the first aspect thereof, and provides an apparatus further comprising in-cylinder pressure detecting means for sampling information related to a pressure within a cylinder of the internal combustion engine, wherein the burning-condition detecting means comprises means for sampling the information related to the pressure within the cylinder of the internal combustion engine at a prescribed timing and in response to the burning parameter, and means for detecting the burning condition in response to the sampled information related to the pressure within the cylinder of the internal combustion engine.

A sixth aspect of this invention is based on the fourth aspect thereof, and provides an apparatus further comprising difference calculating means for calculating a rotational speed difference on the basis of the rotational speed detected by the rotational-speed detecting means, and reference-value calculating means for calculating a reference value of the burning condition on the basis of the rotational speeds of respective cylinders of the internal combustion engine which are detected by the rotational-speed detecting means, wherein the burning-condition detecting means comprises means for detecting the burning condition in response to the reference value calculated by the reference-value calculating means and the rotational speed difference between successive cylinders of the internal combustion engine which are calculated by the difference calculating means.

A seventh aspect of this invention is based on the sixth aspect thereof, and provides an apparatus wherein the rotational speed difference calculated by the difference calculating means is equal to a difference between a minimum rotational speed and a maximum rotational speed detected by the rotational-speed detecting means in one combustion cycle.

An eighth aspect of this invention is based on the first aspect thereof, and provides an apparatus wherein the burning-condition detecting means executes detecting the burning condition only in a given time interval after the internal combustion engine is started.

A ninth aspect of this invention is based on the first aspect thereof, and provides an apparatus further comprising an air-to-fuel ratio sensor for detecting an air-to-fuel ratio of an air-fuel mixture in the internal combustion engine, wherein the burning-condition detecting means executes detecting the burning condition only in a given time interval from a moment of start of the internal combustion engine to a moment of activation of the air-to-fuel ratio sensor.

A tenth aspect of this invention is based on the first aspect thereof, and provides an apparatus further comprising means for controlling an air-to-fuel ratio of an air-fuel mixture in the internal combustion engine in response to the burning condition detected by the burning-condition detecting means.

An eleventh aspect of this invention provides an apparatus for detecting a condition of the burning in an internal combustion engine in which a spark timing is variable. The apparatus comprises first means for detecting a timing of a latest spark in the engine; second means for detecting a rotational speed of the engine at a timing which depends on the latest-spark timing detected by the first means; and third means for detecting a condition of the burning in the engine in response to the rotational speed detected by the second means.

A twelfth aspect of this invention provides an apparatus for detecting a condition of the burning in an internal combustion engine in which a spark timing is variable. The apparatus comprises first means for detecting a timing of every spark in the engine; second means for detecting a rotational speed of the engine at a timing depending on the timing of every spark which is detected by the first means; third means for inhibiting the second means from detecting a rotational speed of the engine twice or more with respect to the timing of every spark which is detected by the first means; and fourth means for detecting a condition of the burning in the engine in response to the rotational speed detected by the second means.

DETAILED DESCRIPTION OF THE INVENTION

First Embodiment

Figure 1:
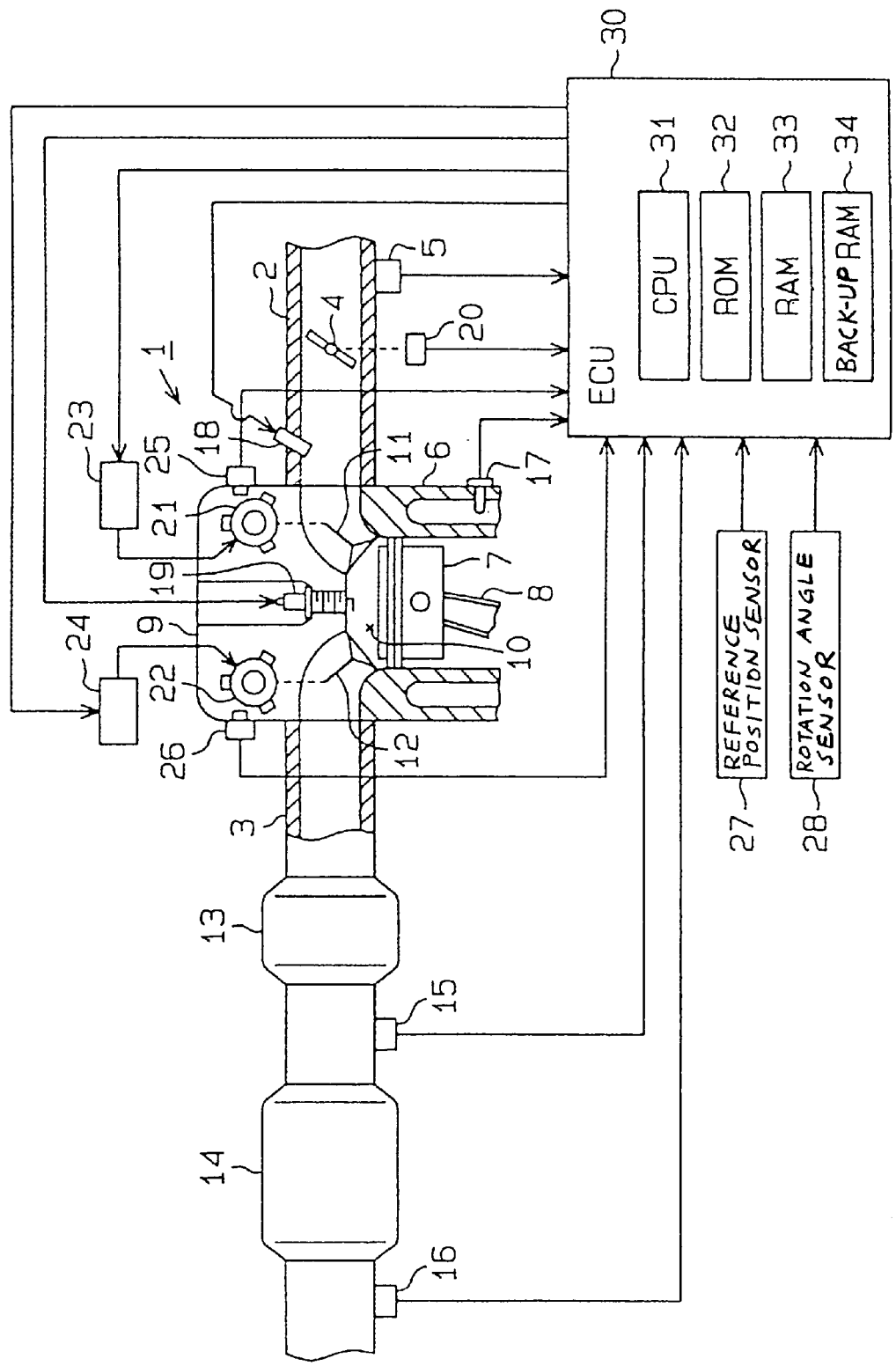
FIG. 1 is a diagram of an engine control apparatus according to a first embodiment of this invention.

FIG. 1 shows an engine control apparatus according to a first embodiment of this invention. The engine control apparatus operates on a 4-cycle multi-cylinder internal combustion engine 1 of a spark ignition type.

As shown in FIG. 1, the engine 1 is provided with an intake pipe 2 and an exhaust pipe 3. A throttle valve 4 is disposed in the intake pipe 2. The throttle valve 4 is connected with an accelerator pedal (not shown). The throttle valve 4 moves or rotates in accordance with depression of the accelerator pedal. An air flow meter 5 is provided in the intake pipe 2 at a position upstream of the throttle valve 4. The device 5 detects the rate of an air flow in the intake pipe 2. The degree of opening through the throttle valve 4, that is, the position of the throttle valve 4, is detected by a throttle sensor 20. Movement of the throttle valve 4 into and out of its fully closed position is also detected by the throttle sensor 20.

The engine 1 has a cylinder block 6. A piston 7 is slidably disposed in each of cylinders in the block 6. The piston 7 is connected with a crankshaft (not shown) via a connection rod 8. A cylinder head 9 is mounted on the cylinder block 6. A combustion chamber 10 is defined by the piston 7, the cylinder block 6, and the cylinder head 9. An inlet port extends from the downstream end of the intake pipe 2 to the combustion chamber 10. An inlet valve 11 selectively blocks and unblocks the communication between the inlet port and the combustion chamber 10. An outlet port extends from the combustion chamber 10 to the upstream end of the exhaust pipe 3. An outlet valve 12 selectively blocks and unblocks the communication between the combustion chamber 10 and the outlet port. The cylinder block 6 is provided with a coolant temperature sensor 17 for detecting the temperature of engine coolant.

A three-way catalytic converter 13 is disposed in the exhaust pipe 3 at a position about 300-mm away from the downstream end of the outlet port. The catalytic converter 13 reduces HC, CO, and NOx in exhaust gas. Another three-way catalytic converter 14 is disposed in the exhaust pipe 3 at a position downstream of the catalytic converter 13. The catalytic converter 14 reduces HC, CO, and NOx in exhaust gas. The capacity of the upstream catalytic converter 13 is smaller than that of the downstream catalytic converter 14. The upstream catalytic converter 13 serves as start one which can be quickly warmed up after the engine 1 is started.

An air-to-fuel ratio sensor 15 is disposed in the exhaust pipe 3 at a position between the catalytic converters 13 and 14. The device 15 senses the oxygen concentration or the carbon monoxide concentration in exhaust gas. In response to the sensed concentration, the device 15 generates and outputs a signal representing the air-to-fuel ratio of an air-fuel mixture causing the exhaust gas. An $O_2$ sensor 16 is disposed in the exhaust pipe 3 at a position downstream of the catalytic converter 14. The $O_2$ sensor 16 detects whether oxygen is present in or absent from exhaust gas. In response to the detected oxygen condition, the $O_2$ sensor 16 generates and outputs a signal representing whether an air-fuel mixture causing the exhaust gas is richer or leaner than stoichiometric.

The engine 1 uses a multi-point injection (MPI) system. Specifically, the intake pipe 2 is formed by an intake manifold having branches provided with fuel injectors 18 respectively. The fuel injectors 18 are of an electromagnetic type or an electrically driven type. A fuel supply system (not shown) feeds pressurized fuel to the fuel injectors 18. Each of the devices 18 injects the fuel into the related inlet port when being energized and opened. Spark plugs 19 provided on the cylinder head 9 correspond to the cylinders of the engine 1 respectively. Each of the spark plugs 19 has an active portion exposed in the related combustion chamber 10. The spark plugs 19 are electrically connected to an igniter (not shown). Each of the spark plugs 19 generates a spark when being supplied with a high voltage from the igniter.

In the inlet port, the fuel injected by the injector 18 mixes with air fed from an upstream side, thereby forming an air-fuel mixture. As the inlet valve 11 opens, the air-fuel mixture enters the combustion chamber 10 from the inlet port. A spark generated by the spark plug 19 ignites the air-fuel mixture in the combustion chamber 10 so that the air-fuel mixture burns therein.

The inlet valve 11 is opened and closed at desired timings by a valve drive mechanism including an inlet-side camshaft 21. Similarly, the outlet valve 12 is opened and closed at desired timings by a valve drive mechanism including an outlet-side camshaft 22. The inlet-side camshaft 21 and the outlet-side camshaft 22 are coupled with the crankshaft via a suitable device such as a timing belt. The inlet-side camshaft 21 and the outlet-side camshaft 22 rotate as the crankshaft rotates. The inlet-side camshaft 21 is provided with a valve-timing varying mechanism 23 of a hydraulically driven type. Similarly, the outlet-side camshaft 22 is provided with a valve-timing varying mechanism 24 of the hydraulically driven type.

The valve-timing varying mechanism 23 acts to adjust the rotation phase of the inlet-side camshaft 21 relative to the crankshaft. Similarly, the valve-timing varying mechanism 24 acts to adjust the rotation phase of the outlet-side camshaft 22 relative to the crankshaft. The valve-timing varying mechanisms 23 and 24 respond to hydraulic pressures applied thereto. The rotation-phase adjustment by the valve-timing varying mechanism 23 is determined by hydraulic pressure control using a solenoid valve (not shown). Similarly, the rotation-phase adjustment by the valve-timing varying mechanism 24 is determined by hydraulic pressure control using a solenoid valve (not shown). The rotation phase of the inlet-side camshaft 21 is retarded and advanced relative to the crankshaft in accordance with the quantity of control of the valve-timing varying mechanism 23. The timings at which the inlet valve 11 is opened and closed are retarded and advanced relative to the crank angle as the rotation phase of the inlet-side camshaft 21 is retarded and advanced. Similarly, the rotation phase of the outlet-side camshaft 22 is retarded and advanced relative to the crankshaft in accordance with the quantity of control of the valve-timing varying mechanism 24. The timings at which the outlet valve 12 is opened and closed are retarded and advanced relative to the crank angle as the rotation phase of the outlet-side camshaft 22 is retarded and advanced.

An inlet-side cam position sensor 25 is associated with the inlet-side camshaft 21. The inlet-side cam position sensor 25 detects the angular position (the rotational position) of the inlet-side camshaft 21. An outlet-side cam position sensor 26 is associated with the outlet-side camshaft 22. The outlet-side cam position sensor 26 detects the angular position (the rotational position) of the outlet-side camshaft 22.

An electronic control unit (ECU) 30 includes a microcomputer having a combination of an input/output port, a CPU 31, a ROM 32, a RAM 33, and a back-up RAM 34. The ECU 30 operates in accordance with a program stored in the ROM 32. The ECU 30 is electrically connected with the air flow meter 5, the air-to-fuel ratio sensor 15, the $O_2$ sensor 16, the coolant temperature sensor 17, the throttle sensor 20, and the cam position sensors 25 and 26 to receive the signals outputted therefrom. The ECU 30 derives operating conditions of the engine 1 from the output signals of the air flow meter 5, the air-to-fuel ratio sensor 15, the O₂ sensor 16, the coolant temperature sensor 17, the throttle sensor 20, and the cam position sensors 25 and 26. The derived engine operating conditions include the air flow rate (the rate of an air flow into the engine 1) Qa, the air-to-fuel ratio of an air-fuel mixture causing the exhaust gas encountering the air-to-fuel ratio sensor 15 upstream of the catalytic converter 14, the rich/lean state of an air-fuel mixture causing the exhaust gas encountering the O₂ sensor 16 downstream of the catalytic converter 14, the engine coolant temperature Tw, the throttle opening degree, the inlet-side camshaft position, and the outlet-side camshaft position.

The ECU 30 is electrically connected with a reference position sensor 27 and a rotation angle sensor 28 to receive signals outputted therefrom. The reference position sensor 27 outputs a pulse for every 720° CA (crank angle). The rotation angle sensor 28 outputs a pulse for every prescribed crank angle, for example, every 30° CA. The ECU 30 derives operating conditions of the engine 1, that is, the reference crank position (a G signal) and the rotational engine speed Ne, from the output signals of the reference position sensor 27 and the rotation angle sensor 28.

The ECU 30 is directly or indirectly connected with the fuel injectors 18, the spark plugs 19, and the valve-timing varying mechanisms 23 and 24. The ECU 30 controls the fuel injectors 18, the spark plugs 19, and the valve-timing varying mechanisms 23 and 24 in response to the detected (derived) operating conditions of the engine 1. The control of the fuel injectors 18 results in control of the rate of fuel injection into the engine 1. The control of the spark plugs 19 results in control of the spark timing. The control of the valve-timing varying mechanisms 23 and 24 results in control of the timings at which the inlet valve 11 and the outlet valve 12 are closed and opened. Accordingly, the ECU 30 controls the fuel injection rate, the spark timing, and the inlet-valve and outlet-valve closing and opening timings in response to the detected (derived) operating conditions of the engine 1.

The rotational engine speed Ne is calculated and detected at a timing which depends on the spark timing. The detected rotational engine speed Ne is used in estimating or detecting a condition of the burning of an air-fuel mixture in the engine 1. The ECU 30 implements control of the air-to-fuel ratio of an air-fuel mixture in the engine 1. The air-to-fuel ratio sensor 15 becomes active when being warmed up. When the air-to-fuel ratio sensor 15 is active, the ECU 30 implements the air-to-fuel ratio control in response to the air-to-fuel ratio detected thereby. Thus, in this case, the ECU 30 implements the feedback control of the air-to-fuel ratio. During an initial stage from cold start of the engine 1 to the moment of the change of the air-to-fuel ratio sensor 15 to its active state, the air-to-fuel ratio of an air-fuel mixture is estimated from the detected condition of the burning. In this case, the ECU 30 implements the air-to-fuel ratio control in response to the estimated air-to-fuel ratio instead of the detected air-to-fuel ratio provided by the air-to-fuel ratio sensor 15. As will be mentioned later, the air-to-fuel ratio control includes air-fuel mixture leaning control.

The ECU 30 is connected with a cranking switch (not shown) and an ignition switch (not shown). The ECU 30 detects whether or not the cranking switch is set to its on position. Also, the ECU 30 detects whether or not the ignition switch is changed to its on position. At cold start of the engine 1, the ECU 30 implements spark-timing retarding control to accelerate the activation of the catalytic converters 13 and 14, the air-to-fuel ratio sensor 15, and the O₂ sensor 16. The spark-timing retarding control holds the spark timing in a range retarded from a normal range. Specifically, during at least a portion of the time interval from the moment at which the rotational engine speed rises to a given value (for example, 400 rpm) to the moment of the activation of the devices 13–16, the ECU 30 holds the spark timing in the retarded range. Preferably, the ECU 30 adjusts the spark timing in response to the load on the engine 1 while implementing the spark-timing retarding control. The moment of the change of the ignition switch to its on position may be used instead of the moment of the setting of the cranking switch to its on position. When the devices 13–16 are activated, the ECU 30 suspends the spark-timing retarding control. Then, the ECU 30 implements normal spark-timing control which responds to the operating conditions of the engine 1.

Figure 2:
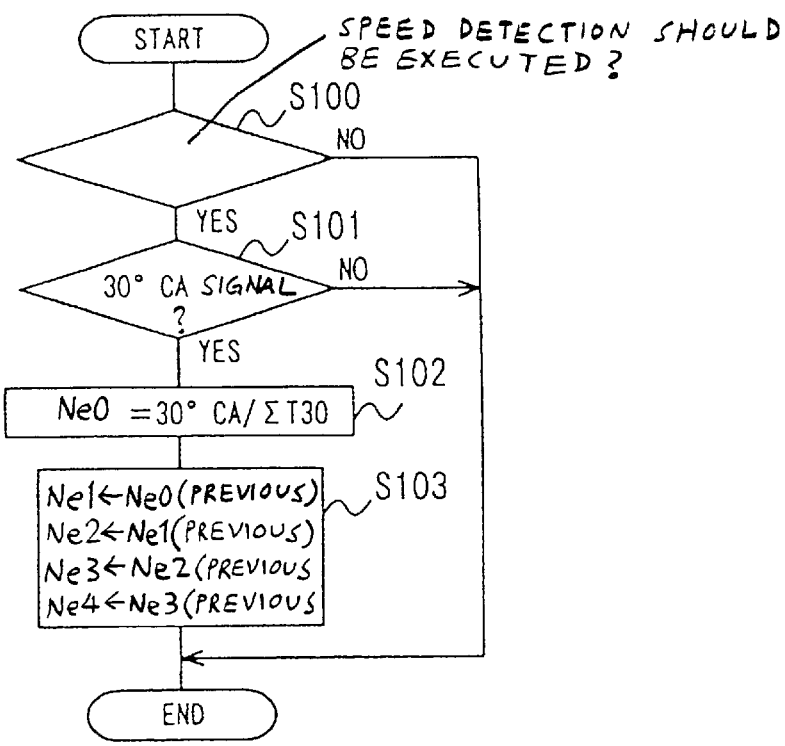
FIG. 2 is a flowchart of a first segment of a program for an ECU in FIG. 1.

As previously mentioned, the ECU 30 operates in accordance with a program stored in the ROM 32. FIG. 2 is a flowchart of a first segment (a first subroutine) of the program which is repetitively executed.

With reference to FIG. 2, a first step S100 of the program segment detects the latest ignition (the latest spark). The step S100 determines whether or not the detection of the rotational engine speed has already been executed regarding the detected latest ignition. This determination by the step S100 is to decide whether or not the detection of the rotational engine speed should be executed. In the case where the detection of the rotational engine speed has already been executed regarding the detected latest ignition, the program exits from the step S100 and then the current execution cycle of the program segment ends. On the other hand, in the case where the detection of the rotational engine speed has not yet been executed regarding the detected latest ignition, the program advances from the step S100 to a step S101.

The step S101 determines whether or not a 30°-CA pulse (for example, a second 30°-CA pulse after the detected latest ignition) in the output signal of the rotation angle sensor 28 is detected. When a 30°-CA pulse is detected, the program advances from the step S101 to a step S102. Otherwise, the program exits from the step S101, and then the current execution cycle of the program segment ends.

The step S102 calculates the current rotational engine speed Ne0. Specifically, the step S102 computes the latest time interval ΣT30 taken by the crankshaft to rotate through 30° CA. The step S102 calculates the current rotational engine speed Ne0 from 30° CA and the computed time interval ΣT30 according to the equation as "Ne0=30° CA/ΣT30". In more detail, another segment of the program resets and starts a timer in response to the reception of every 30°-CA pulse. The step S102 gets the latest time interval ΣT30 by referring to the timer immediately before the timer is reset in response to the reception of the present 30°-CA pulse. Thus, the measurement of the latest time interval ΣT30 starts from the moment of the reception of the 30°-CA pulse immediately preceding the present 30°-CA pulse, and finishes at the moment of the reception of the present 30°-CA pulse.

A step S103 following the step S102 updates rotational engine speeds Ne1, Ne2, Ne3, and Ne4. The rotational engine speed Ne1 denotes one which occurs at a moment preceding the present moment by one burning procedure. The rotational engine speed Ne2 denotes one which occurs at a moment preceding the present moment by two burning procedures. The rotational engine speed Ne3 denotes one which occurs at a moment preceding the present moment by three burning procedures. The rotational engine speed Ne4 denotes one which occurs at a moment preceding the present moment by four burning procedures. Specifically, the step S103 updates the rotational engine speeds Ne1, Ne2, Ne3, and Ne4 to the immediately previous values Ne0, Ne1, Ne2, and Ne3, respectively. In more detail, the step S103 sets the rotational engine speed Ne1 to the immediately previous value Ne0. The step S103 sets the rotational engine speed Ne2 to the immediately previous value Ne1. The step S104 sets the rotational engine speed Ne3 to the immediately previous value Ne2. The step S104 sets the rotational engine speed Ne4 to the immediately previous value Ne3. After the step S103, the current execution cycle of the program segment ends.

The step S100 permits the step S102 to calculate and detect the rotational engine speed Ne only once for one ignition. In other words, the step S100 inhibits the step S102 from calculating and detecting the rotational engine speed Ne twice or more for one ignition. The step S101 permits the step S102 to calculate and detect the rotational engine speed Ne only when a 30°-CA pulse is detected. In other words, the step S101 prevents the step S102 from calculating and detecting the rotational engine speed Ne when a 30°-CA pulse is not detected.

Figure 3:
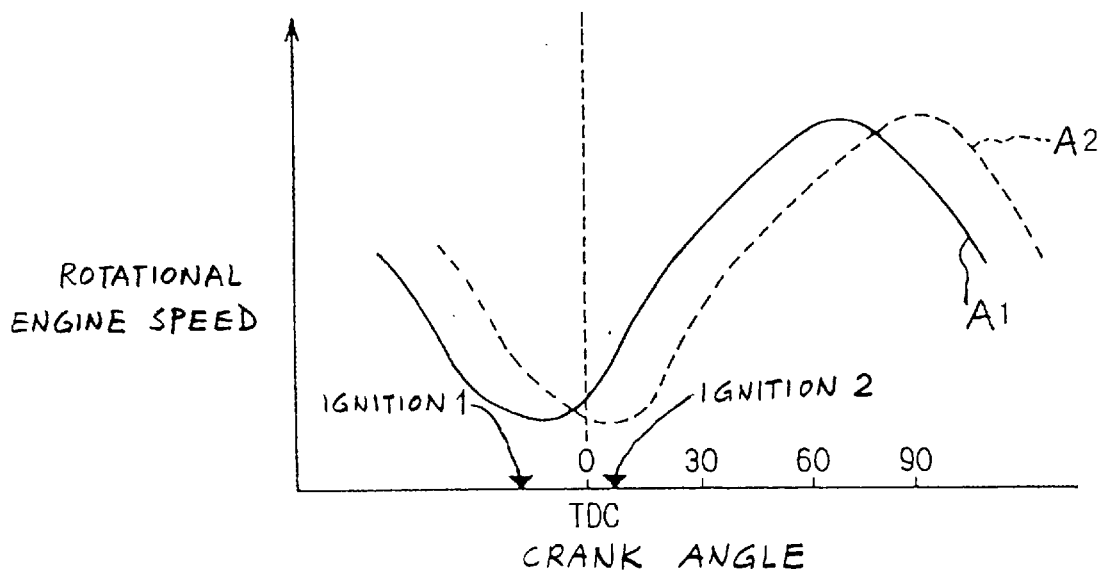
FIG. 3 is a diagram of the relation among the rotational engine speed, the crank angle, and the spark timing.

With reference to FIG. 3, a normal spark timing (a normal ignition timing) "1" precedes a crank angle of TDC (top dead center). In general, a crank angle of TDC is represented by the output signal of the reference position sensor 27 or the rotation angle sensor 28. In the case of such a normal spark timing, the rotational engine speed varies along the curve A1 as the crank angle progresses. A retarded spark timing (a retarded ignition timing) "2" delays from the normal spark timing "1", and follows a crank angle of TDC. In the case of such a retarded spark timing, the rotational engine speed varies along the curve A2 as the crank angle progresses. The speed variation A2 related to the retarded spark timing delays from the speed variation A1 corresponding to the normal spark timing. The speed variations A1 and A2 depend on a condition of the burning of the air-fuel mixture which varies in accordance with the crank angle. Therefore, such a speed variation or the rotational engine speed can be used as an indication of a burning condition. The phase of each of the speed variations A1 and A2 reflects the phase of the burning condition which is determined by the spark timing. Accordingly, in the case where the timing of detection of the rotational engine speed is changed in accordance with the spark timing, the speed detection timing can be held in a fixed relation with a burning condition. In this case, regardless of the spark timing, the result of the speed detection remains accurate as an indication of the burning condition.

Figure 4:
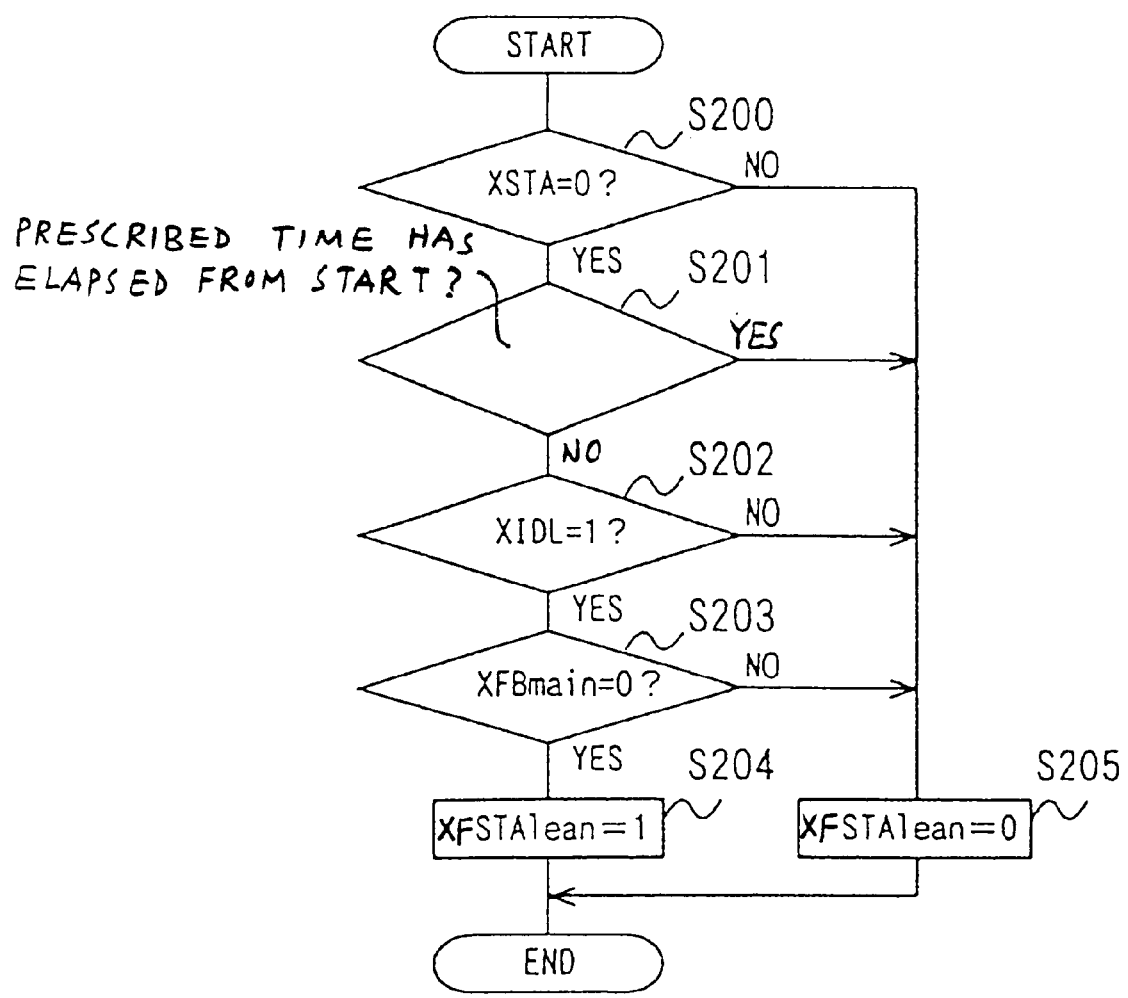
FIG. 4 is a flowchart of a second segment of the program for the ECU in FIG. 1.

FIG. 4 is a flowchart of a second segment (a second subroutine) of the program for the ECU 30 which is repetitively executed. As shown in FIG. 4, a first step S200 of the program segment refers to a flag XSTA. Another segment of the program sets the flag XSTA to "1" in the case where the engine 1 has not yet been started from a self-sustaining viewpoint, and sets the flag XSTA to "0" when the engine 1 has been started from a self-sustaining viewpoint. The step S200 determines whether or not the flag XSTA is "0", that is, whether or not the engine 1 has been started from a self-sustaining viewpoint. When the flag XSTA is "0", that is, when the engine 1 has been started, the program advances from the step S200 to a step S201. When the flag XSTA is "1", that is, when the engine 1 has not yet been started, the program advances from the step S200 to a step S205. The conditions of the determination as to the engine start may be based on the fact that the rotational speed Ne of the engine 1 exceeds a prescribed value (for example, 400 rpm) after a cranking switch is set to its on position. Alternatively, the conditions of the determination as to the engine start may use known conditions.

The step S201 gets information of the lapse of time from the moment of the engine start. The step S201 compares the lapse of time with a prescribed time interval. When the lapse of time is shorter than the prescribed time interval, the program advances from the step S201 to a step S202. When the lapse of time reaches the prescribed time interval, the program advances from the step S201 to the step S205. Preferably, the prescribed time interval is equal to a time taken by the air-to-fuel ratio sensor 15 to become active after the start of the engine 1. The prescribed time interval may be varied in accordance with the engine coolant temperature detected by the coolant temperature sensor 17.

The step S202 refers to a flag XIDL. Another segment of the program sets the flag XIDL to "1" when 0the engine 1 is idling, and sets the flag XIDL to "0" when the engine 1 moves out of its idling state. The step S202 determines whether or not the flag XIDL is "1", that is, whether or not the engine 1 is idling. When the flag XIDL is "1", that is, when the engine 1 is idling, the program advances from the step S202 to a step S203. Otherwise, the program advances from the step S202 to the step S205.

The step S203 refers to a flag XFBmain. Another segment of the program sets the flag XFBmain to "1" when the air-to-fuel ratio feedback control is executed, and sets the flag XFBmain to "0" when the air-to-fuel ratio feedback control is suspended. The step S203 determines whether or not the flag XFBmain is "0", that is, whether the air-to-fuel ratio feedback control is executed or suspended. When the flag XFBmain is "0", that is, when the air-to-fuel ratio feedback control is suspended, the program advances from the step S203 to a step S204. When the flag XFBmain is "1", that is, when the air-to-fuel ratio feedback control is executed, the program advances from the step S203 to the step S205.

The step S204 sets a flag XFSTAlean to "1". The flag XFSTAlean being "1" causes the execution of air-fuel mixture leaning control. After the step S204, the current execution cycle of the program segment ends.

The step S205 sets the flag XFSTAlean to "0". The flag XFSTAlean being "0" inhibits the air-fuel mixture leaning control from being executed. After the step S205, the current execution cycle of the program segment ends.

Figure 5:
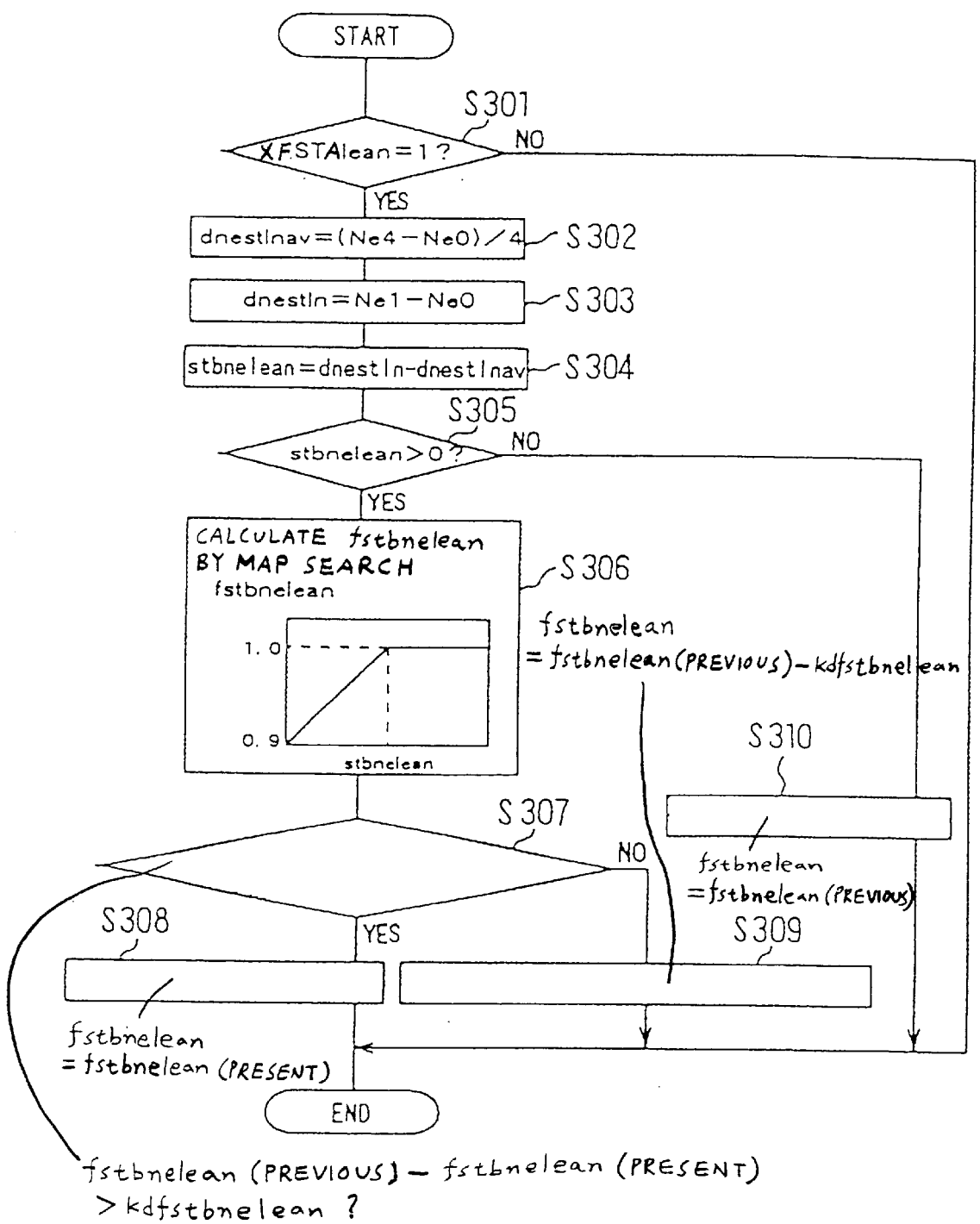
FIG. 5 is a flowchart of a third segment of the program for the ECU in FIG. 1.

FIG. 5 is a flowchart of a third segment (a third subroutine) of the program for the ECU 30 which is repetitively executed. As shown in FIG. 5, a first step S301 of the program segment determines whether or not the flag XFSTAlean is "1". When the flag XFSTAlean is "1", the program advances from the step S301 to a step S302. Otherwise, the program exits from the step S301, and then the current execution cycle of the program segment ends.

The step S302 refers to the rotational engine speeds Ne0 and Ne4 given by the program segment in FIG. 2. The step S302 calculates a reference value "dnestlnav" from the rotational engine speeds Ne0 and Ne4 according to the following equation.

$$dnestlenav = (Ne4 - Ne0)/4 \qquad (1)$$

The equation (1) is derived from the equation as "dnestlenav={(Ne4−Ne3)+(Ne3−Ne2)+(Ne2−Ne1)+(Ne1−Ne0)}/4". Thus, the equation (1) means that the rotational speed differences between successive cylinders are calculated from the rotational speeds available in one combustion cycle, and the calculated differences are summed up, and that the reference value "dnestlnav" is equal to the resultant sum divided by the total number of the cylinders in the engine 1 (that is, four). The reference value "dnestlnav" agrees with an average speed variation.

A step S303 following the step S302 refers to the rotational engine speeds Ne0 and Ne1 given by the program segment in FIG. 2. The step S303 subtracts the rotational engine speed Ne0 from the rotational engine speed Ne1 to calculate the difference "dnestln" therebetween. The difference "dnestln" agrees with a current speed variation.

A step S304 subsequent to the step S303 subtracts the reference value "dnestlnav" from the value "dnestln" to calculate the difference "stbnelean" therebetween. In other words, the step S304 calculates the deviation "stbnelean" of the current speed variation "dnestln" from the average speed variation "dnestlnav". The difference (the deviation) "stbnelean" depends on a condition of the burning of the air-to fuel mixture in the engine 1. Thus, the difference "stbnelean" is used as an indication of the burning condition. Accordingly, the steps S302, S303, and S304 detect a condition of the burning from the rotational engine speeds Ne0, Ne1, and Ne4.

A step S305 following the step S304 compares the difference "stbnelean" with zero to determine whether or not the detected burning condition is in a given range. When the difference "stbnelean" is greater than zero, the program advances from the step S305 to a step S306. Otherwise, the program advances from the step S305 to a step S310.

Figure 6:
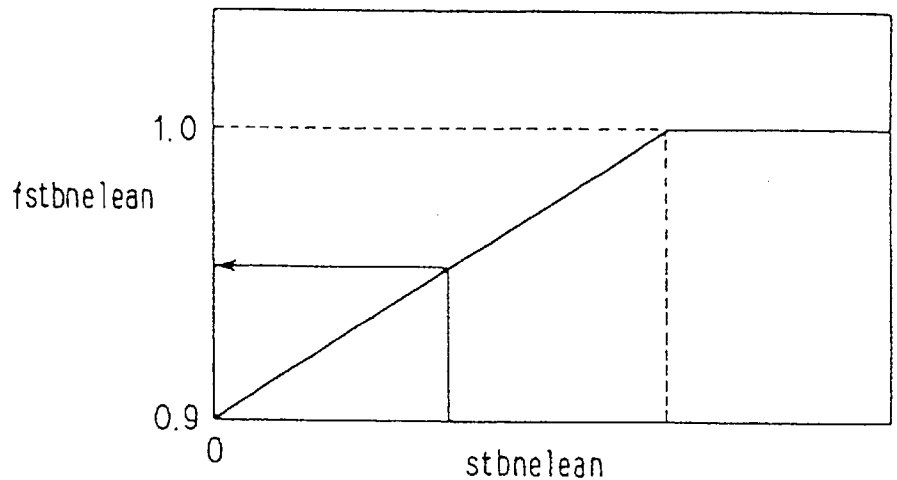
FIG. 6 is a diagram of a map denoting a predetermined relation between a corrective value "fstbnelean" and a difference "stbnelean".

The step S306 calculates an air-to-fuel ratio corrective value "fstbnelean" from the difference "stbnelean" according to a map provided in the ROM 32. The map denotes a predetermined relation between the difference "stbnelean" and the corrective value "fstbnelean". FIG. 6 shows an example of the map in which the corrective value "fstbnelean" increases from 0.9 to 1.0 as the difference "stbnelean" increases.

A step S307 subsequent to the step S306 retrieves the immediately previous corrective value "fstbnelean" (old) generally available during the execution cycle of the program segment which immediately precedes the current execution cycle thereof. The step S307 refers to the present corrective value "fstbnelean" (present) given by the step S306 during the current execution cycle of the program segment. The step S307 determines whether or not the immediately previous corrective value "fstbnelean" (old) is greater than the present corrective value "fstbnelean" (present) by greater than a prescribed value "kdfstbnelean". When the immediately previous corrective value "fstbnelean" (old) is greater than the present corrective value "fstbnelean" (present) by greater than the prescribed value "kdfstbnelean", the program advances from the step S307 to a step S308. Otherwise, the program advances from the step S307 to a step S309.

The step S308 sets a final corrective value "fstbnelean" to the present corrective value "fstbnelean" (present). After the step S308, the current execution cycle of the program segment ends.

The step S309 sets the final corrective value "fstbnelean" to the present corrective value "fstbnelean" (present) minus the prescribed value "kdfstbnelean". After the step S309, the current execution cycle of the program segment ends. The steps S307 and S309 prevent the air-to-fuel ratio control from hunting due to enrichment of the air-fuel mixture. Thus, the steps S307 and S309 implements the anti-hunting control.

The step S310 sets the final corrective value "fstbnelean" to the immediately previous corrective value "fstbnelean" (old). After the step S310, the current execution cycle of the program segment ends. The steps S305 and S310 hold the final corrective value "fstbnelean" at the immediately previous corrective value "fstbnelean" (old) when the difference "stbnelean" is equal to or smaller than zero.

The final corrective value "fstbnelean" given by the step S308, S309, or S310 is used by another program segment for controlling the air-to-fuel ratio of the air-fuel mixture. Specifically, another program segment drives the fuel injectors 18, and hence controls the fuel injection rate and also the air-to-fuel ratio of the air-fuel mixture in response to the final corrective value "fstbnelean". In this case, the control of the air-to-fuel ratio corresponds to the air-fuel mixture leaning control.

As previously mentioned, the timing of the detection of the rotational engine speed Ne is changed in accordance with the spark timing, and the burning condition is detected from the detected rotational engine speed Ne. The air-to-fuel ratio of the air-fuel mixture is controlled in response to the detected burning condition. In this case, the detected burning condition is used as an indication of the air-to-fuel ratio. Therefore, even during a time interval after cold start of the engine 1 for which the air-to-fuel ratio sensor 15 remains inactive, the air-to-fuel ratio can be accurately controlled at a desired ratio providing the suppression of harmful emission from the engine 1.

Figure 7:
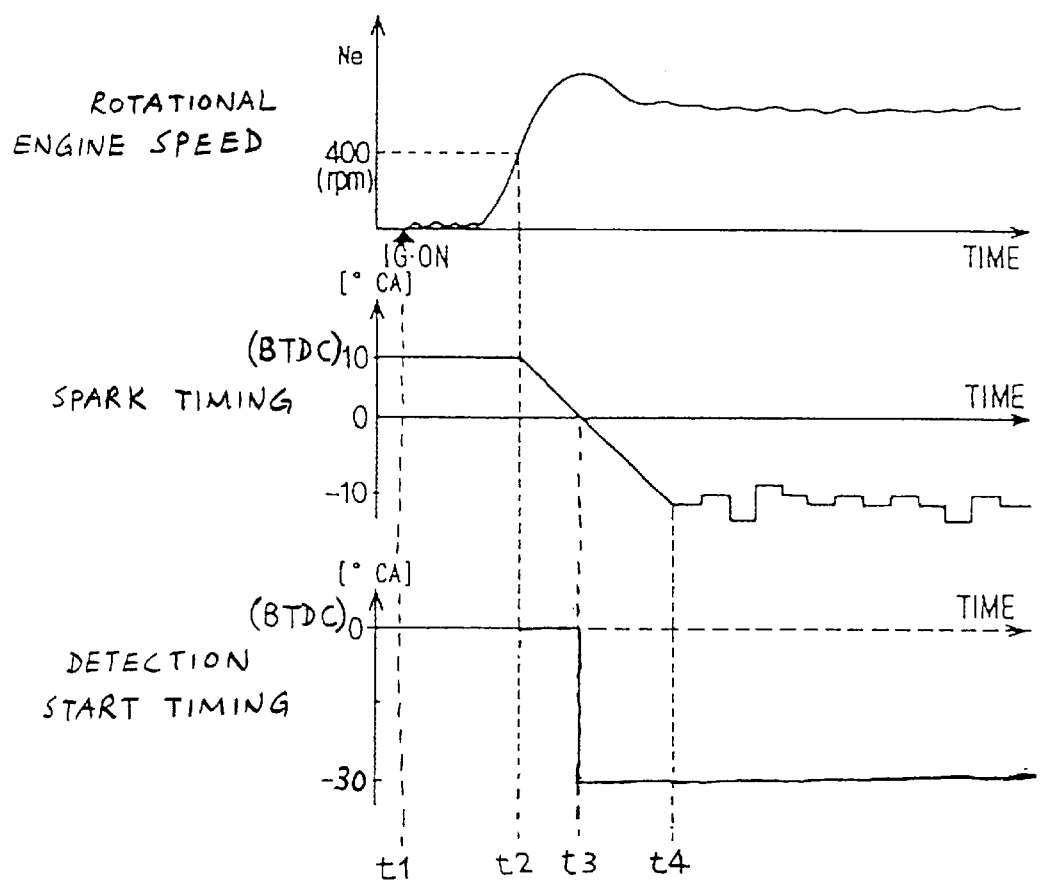
FIG. 7 is a time-domain diagram of the rotational engine speed, the spark timing, and the timing of the detection of the rotational engine speed in the first embodiment of this invention.

With reference to FIG. 7, the ignition switch is changed to its on position at a moment t1 under conditions where the engine 1 is cold. After the change of the ignition switch to its on position (after the moment t1), the rotational engine speed basically increases. At a moment t2 following the moment t1, the rotational engine speed exceeds 400 rpm, and hence it is determined that the engine 1 has been started from a self-sustaining viewpoint. During the time interval between the moments t1 and t2, the spark timing is held equal to a prescribed timing, for example, an MBT-based timing. Here, MBT is short for "minimum spark advance for best torque". After the moment t2, the spark timing is retarded from the prescribed timing toward a desired timing (determined by the spark-timing retarding control) in accordance with the lapse of time. At a moment t3 following the moment t2, the spark timing crosses a crank angle of TDC (a crank angle of 0°). Until the moment t3, the start timing of the detection of the rotational engine speed (that is, the start timing of the detection of the burning condition) which coincides with the start timing of the measurement of the related time interval ΣT30 remains equal to a given timing corresponding to 0° CA. At the moment t3, the speed detection start timing is retarded from 0° CA to BTDC-30° CA. Here, BTDC is short for "before top dead center". At a moment t4 following the moment t3, the spark timing reaches the desired timing. After the moment t4, the spark timing is adjusted by the spark-timing retarding control which responds to the load on the engine 1, and which is designed for accelerating the activation of the upstream catalytic converter 13. After the moment t3, the speed detection start timing remains equal to BTDC-30° CA.

Figure 8:
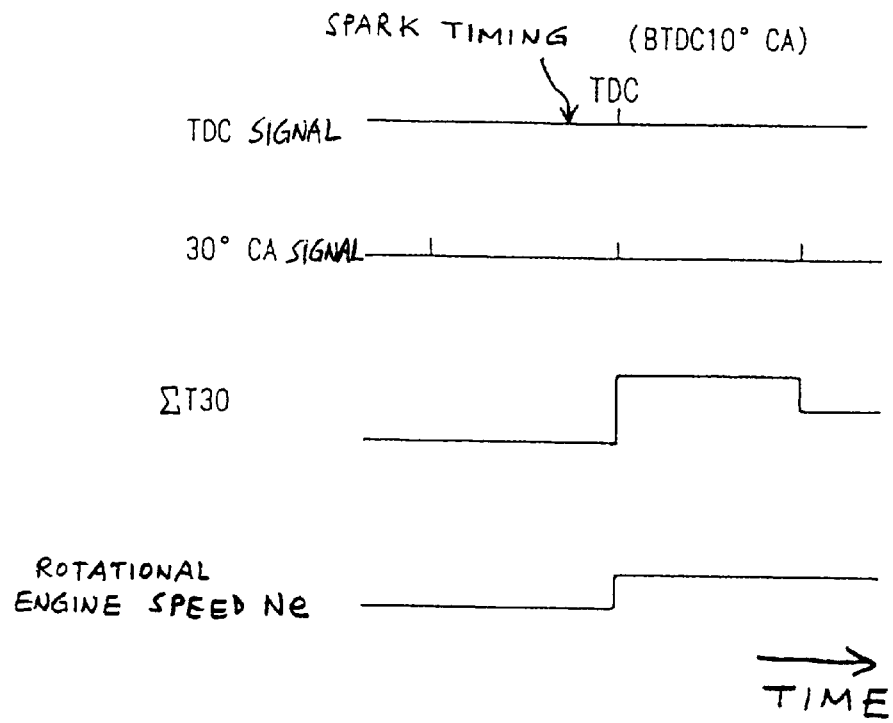
FIG. 8 is a time-domain diagram of a TDC signal, a 30°-CA signal, a calculated time interval ΣT30, and a detected rotational engine speed Ne which occur in the case where the spark timing is advanced from a crank angle of TDC (top dead center).
Figure 9:
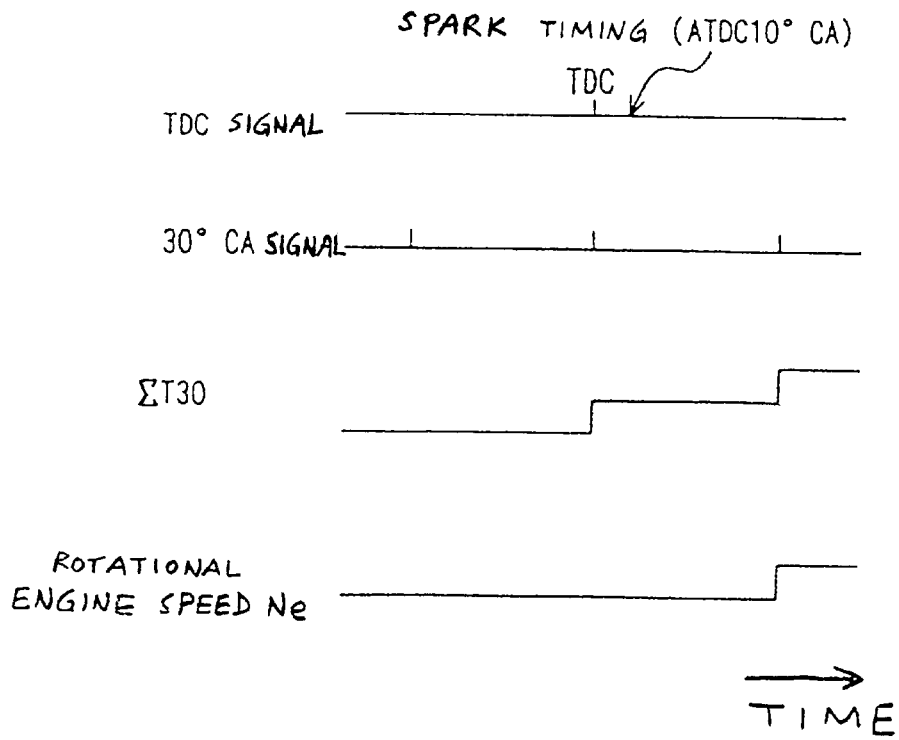
FIG. 9 is a time-domain diagram of the TDC signal, the 30°-CA signal, the calculated time interval ΣT30, and the detected rotational engine speed Ne which occur in the case where the spark timing is retarded from a crank angle of TDC.

As shown in FIG. 8, a TDC signal contained in the output signal of the reference position sensor 27 has a pulse occurring at a crank angle of TDC. A 30°-CA signal contained in the output signal of the rotation angle sensor 28 has pulses spaced at intervals of 30° CA. One among the pulses in the 30°-CA signal occurs at a crank angle of TDC. The time interval ΣT30 taken by the crankshaft to rotate through 30° CA is updated synchronously with the 30°-CA signal. In addition, the detected rotational engine speed Ne is updated synchronously with the 30°-CA signal. In the case where the spark timing is advanced from TDC by 10° CA as shown in FIG. 8, the rotational engine speed Ne is detected at a timing given by a second pulse of the 30°-CA signal after the spark timing. In this case, the start timing of the measurement of the related time interval ΣT30 coincides with TDC. On the other hand, in the case where the spark timing is retarded from TDC by 10° CA as shown in FIG. 9, the rotational engine speed Ne is detected at a timing given by a second pulse of the 30°-CA signal after the spark timing. In this case, the start timing of the measurement of the related time interval ΣT30 coincides with BTDC–30° CA, that is, +30° CA from TDC. Thus, the speed detection timing and also the burning-condition detection timing depend on whether the spark timing is advanced or retarded from TDC.

Figure 10:
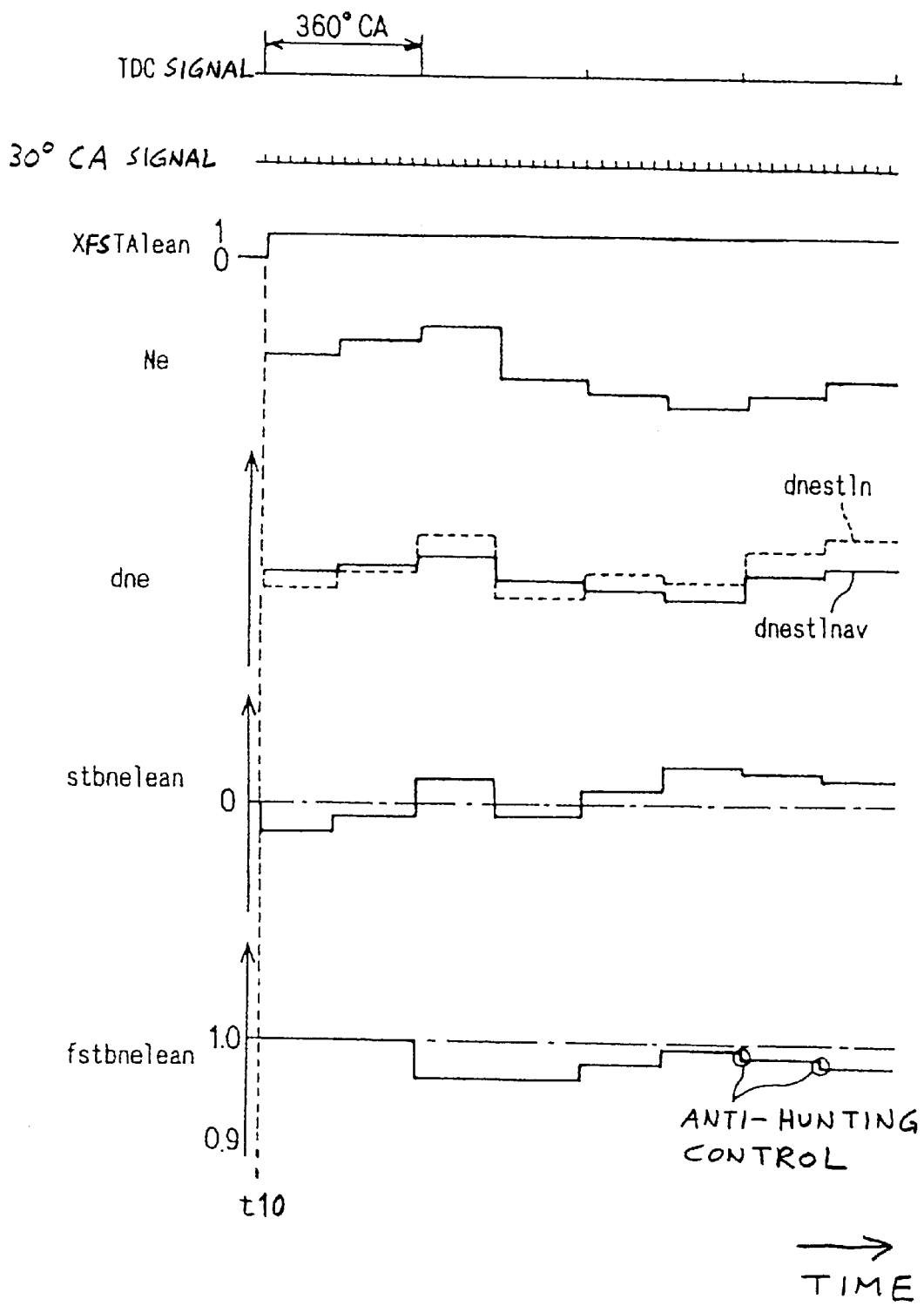
FIG. 10 is a time-domain diagram of the TDC signal, the 30°-CA signal, a flag XFSTAlean, the detected rotational engine speed Ne, and calculated values "dnestln", "dnestlnav", "stbnelean", and "fstbnelean".

With reference to FIG. 10, at a moment t10, the flag XFSTAlean is set to "1" by the step S204 in FIG. 4. When the flag XFSTAlean is set to "1", the ECU 30 starts executing the air-fuel mixture leaning control. The rotational engine speed Ne is detected at a timing depending on the spark timing. Therefore, the detected rotational engine speed Ne remains accurate as an indication of the burning condition even when the spark timing is changed. The detected rotational engine speed Ne is periodically updated. The burning condition is detected on the basis of the detected rotational engine speed Ne. The air-fuel mixture leaning control is responsive to the detected burning condition. Accordingly, even before the air-to-fuel ratio sensor 15 and the $O_2$ sensor 16 become active, the burning of the air-fuel mixture can be stabilized by the air-fuel mixture leaning control. The average speed variation "dnestlnav" is calculated from the detection values Ne0 and Ne4 of the rotational engine speed according to the previously indicated equation (1), that is, "(Ne4–Ne0)4". In addition, the current speed variation "dnestln" is calculated from the detection values Ne0 and Ne1 of the rotational engine speed according to the equation as "dnestln=Ne1–Ne0". The average speed variation "dnestlnav" and also the current speed variation "dnestln" are updated as the detected rotational engine speed Ne is updated. The burning-condition-representing value "stbnelean" is calculated from the average speed variation "dnestlnav" and also the current speed variation "dnestln" according to the equation as "stbnelean=dnestln-dnestlnav". The case where the current speed variation "dnestln" is greater than the average speed variation "dnestlnav" corresponds to a lean air-fuel mixture. In other words, the difference value "stbnelean" being positive indicates that the air-fuel mixture is leaner than stoichiometric. The burning-condition-representing value "stbnelean" is updated as the detected rotational engine speed Ne is updated. The corrective value "fstbnelean" is calculated from the burning-condition-representing value "stbnelean". The calculated corrective value "fstbnelean" is used for correcting the fuel injection rate Tp or the air-to-fuel ratio of the air-fuel mixture. In the case where the immediately previous corrective value "fstbnelean" (old) is greater than the present corrective value "fstbnelean" (present) by greater than the prescribed value "kdfstbnelean", the present corrective value "fstbnelean" (present) is used as the final corrective value "fstbnelean". Otherwise, the final corrective value "fstbnelean" is set so as to implement the anti-hunting control. Basically, the final corrective value "fstbnelean" is updated as the detected rotational engine speed Ne is updated.

As previously mentioned, the timing of the detection of the rotational engine speed Ne is changed in accordance with the spark timing, and the burning condition is detected from the detected rotational engine speed. The change of the speed detection timing in accordance with the spark timing enables the burning condition to be accurately detected. The air-to-fuel mixture leaning control is responsive to the detected burning condition. Since the detected burning condition is accurate, the air-to-fuel mixture leaning control can properly stabilize the burning of the air-fuel mixture.

The burning condition may be detected on the basis of the pressure within a cylinder of the engine 1. In this case, the timing of the detection of the in-cylinder pressure is set in response to the spark timing by referring to a predetermined map. The timing of the detection of the rotational engine speed Ne or the timing of the detection of the in-cylinder pressure may be set in response to the timing at which the outlet valve 12 is opened.

The steps S302, S303, S304, and S305 in FIG. 5 correspond to a burning-condition detecting means. The program segment in FIG. 2 corresponds to a rotational-speed detecting means. The step S303 in FIG. 5 corresponds to a difference calculating means. The step S302 in FIG. 5 corresponds to a reference-value calculating means.

Second Embodiment

A second embodiment of this invention is similar to the first embodiment thereof except for design changes mentioned hereafter. The crank angle intervals between the points of repetitive detection of the rotational engine speed in the second embodiment of this invention are shorter than those in the first embodiment thereof.

Figure 11:
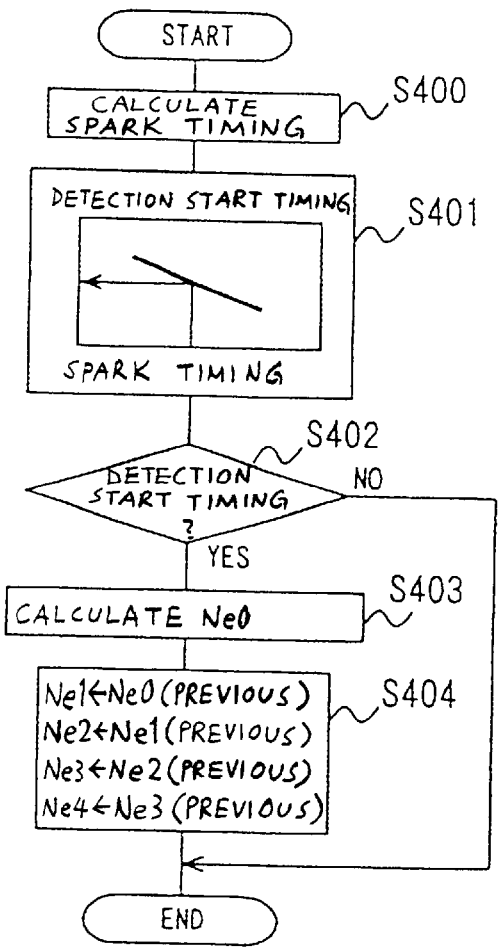
FIG. 11 is a flowchart of a segment of a program for an ECU in a second embodiment of this invention.

FIG. 11 is a flowchart of a segment (a subroutine) of a program for an ECU 30 in the second embodiment of this invention. The program segment in FIG. 11 is repetitively executed.

As shown in FIG. 11, a first step S400 of the program segment calculates a spark timing.

Figure 12:
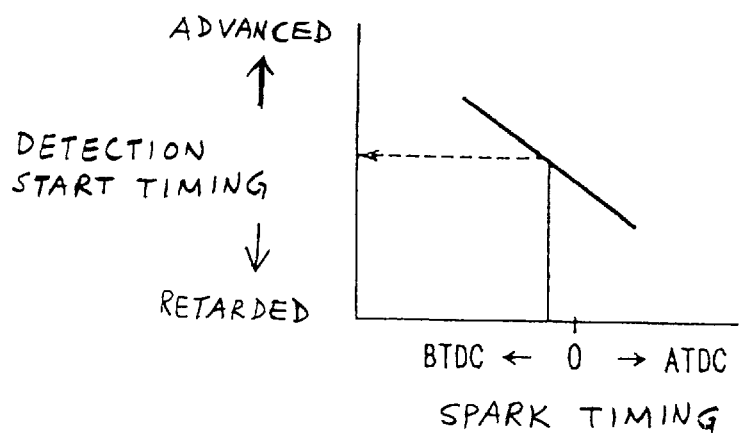
FIG. 12 is a diagram of a map denoting a predetermined relation between the speed detection start timing and the spark timing.

A step S401 following the step S400 sets a speed detection start timing in response to the calculated spark timing according to a map provided in a ROM 32. The map denotes a predetermined relation between the speed detection start timing and the spark timing. FIG. 12 shows an example of the map in which the speed detection start timing is retarded and advanced as the spark timing is retarded and advanced respectively.

A step S402 subsequent to the step S401 determines whether or not the present moment coincides with the speed detection start timing. When the present moment coincides with the speed detection start timing, the program advances from the step S402 to a step S403. Otherwise, the program exits from the step S402, and then the current execution cycle of the program segment ends.

The step S403 calculates the current rotational engine speed Ne0 as the step S102 in FIG. 2 does.

A step S404 following the step S403 updates rotational engine speeds Ne1, Ne2, Ne3, and Ne4 as the step S103 in FIG. 2 does. After the step S404, the current execution cycle of the program segment ends.

The start timing of the detection of the rotational engine speed Ne is set in response to the spark timing according to the map, and the burning condition is detected from the detected rotational engine speed. The change of the speed detection start timing in response to the spark timing provides accurate detection of the burning condition.

The burning condition may be detected on the basis of the pressure within a cylinder of an engine 1. In this case, the start timing of the detection of the in-cylinder pressure is set in response to the spark timing by referring to a predetermined map. The start timing of the detection of the rotational engine speed Ne or the start timing of the detection of the in-cylinder pressure may be set in response to the timing at which an outlet valve 12 is opened.

Third Embodiment

A third embodiment of this invention is similar to the first embodiment thereof except for design changes mentioned hereafter. The crank angle intervals between the points of repetitive detection of the rotational engine speed in the third embodiment of this invention are shorter than those in the first embodiment thereof.

Figure 13:
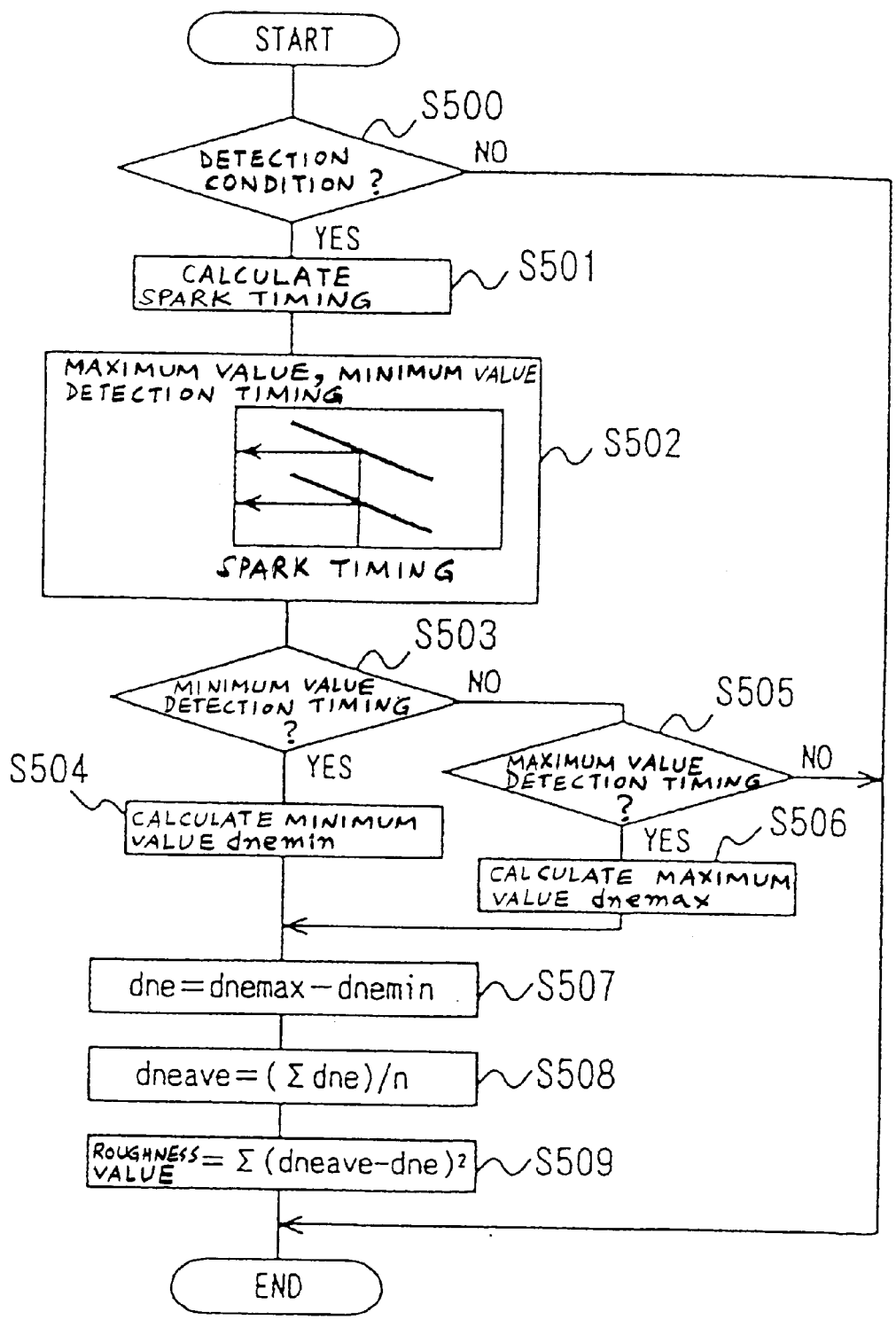
FIG. 13 is a flowchart of a segment of a program for an ECU in a third embodiment of this invention.

FIG. 13 is a flowchart of a segment (a subroutine) of a program for an ECU 30 in the third embodiment of this invention. The program segment in FIG. 13 is repetitively executed.

As shown in FIG. 13, a first step S500 of the program segment determines whether or not prescribed conditions for detection are satisfied. When the prescribed conditions for detection are satisfied, the program advances from the step S500 to a step S501. Otherwise, the program exits from the step S500, and then the current execution cycle of the program segment ends.

The step S501 calculates a spark timing. After the step S501, the program advances to a step S502.

Figure 14:
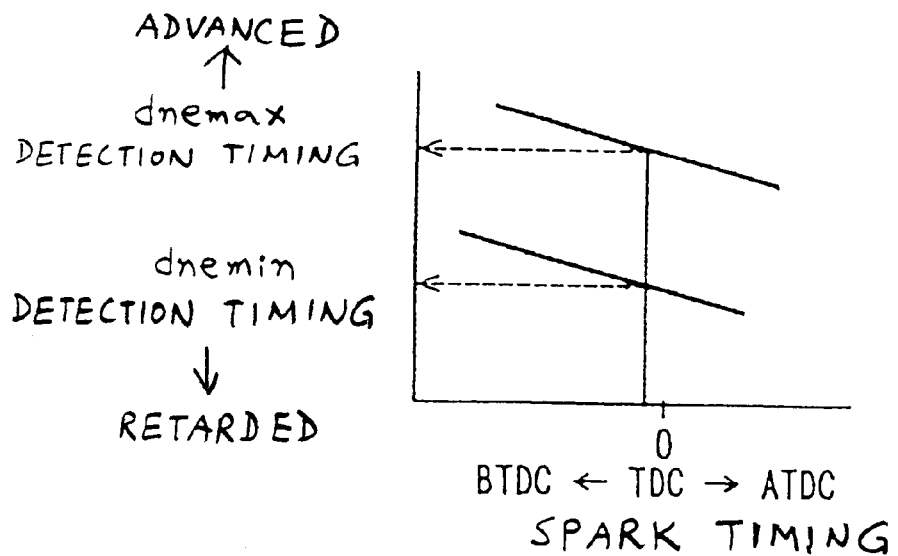
FIG. 14 is a diagram of a map denoting a predetermined relation between the maximum-value detection timing and the spark timing, and also a predetermined relation between the minimum-value detection timing and the spark timing.

The step S502 sets a maximum-value detection timing and a minimum-value detection timing in response to the calculated spark timing according to a map provided in a ROM 32. The map denotes a predetermined relation between the maximum-value detection timing and the spark timing, and also a predetermined relation between the minimum-value detection timing and the spark timing. FIG. 14 shows an example of the map in which the maximum-value detection timing is retarded and advanced as the spark timing is retarded and advanced respectively, and also the minimum-value detection timing is retarded and advanced as the spark timing is retarded and advanced respectively.

Figure 15:
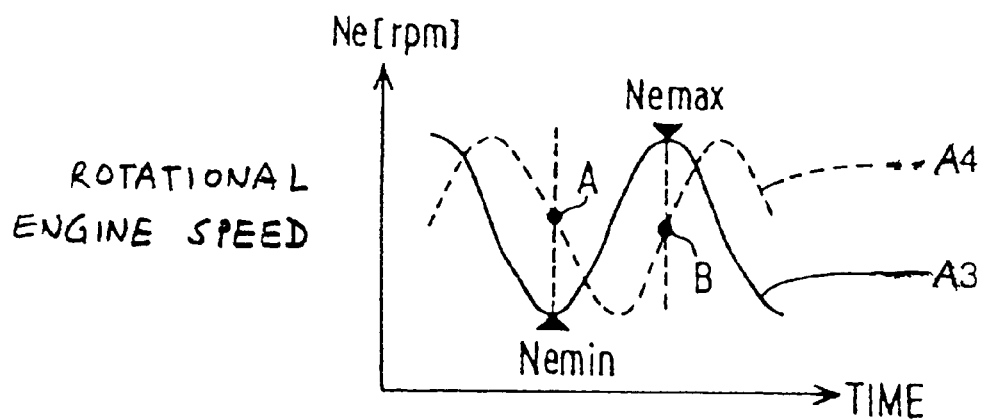
FIG. 15 is a time-domain diagram of examples of variations in the rotational engine speed.

With reference to FIG. 15, in the case of a normal spark timing, the rotational engine speed periodically varies along the curve A3 as the crank angle progresses. On the other hand, in the case of a retarded spark timing, the rotational engine speed periodically varies along the curve A4 as the crank angle progresses. The speed variation A4 related to the retarded spark timing delays from the speed variation A3 corresponding to the normal spark timing. The maximum-value detection timing and the minimum-value detection timing set by the step S502 are designed to coincide with respective moments of the occurrence of a maximum value Nemax and a minimum value Nemin of the rotational engine speed independent of the spark timing.

In FIG. 13, a step S503 following the step S502 determines whether or not the present moment coincides with the minimum-value detection timing. When the present moment coincides with the minimum-value detection timing, the program advances from the step S503 to a step S504. Otherwise, the program advances from the step S503 to a step S505.

The step S504 calculates a minimum value "dnemin" of the rotational engine speed Ne. After the step S504, the program advances to a step S507.

The step S505 determines whether or not the present moment coincides with the maximum-value detection timing. When the present moment coincides with the maximum-value detection timing, the program advances from the step S505 to a step S506. Otherwise, the program exits from the step S505, and then the current execution cycle of the program segment ends.

The step S506 calculates a maximum value "dnemax" of the rotational engine speed Ne. After the step S506, the program advances to the step S507.

The step S507 subtracts the minimum rotational engine speed "dnemin" from the maximum rotational engine speed "dnemax" to calculate the difference "dne" therebetween which occurs in one combustion cycle.

A step S508 subsequent to the step S507 sums up the differences "dne" corresponding to respective cylinders of an engine 1. The step S508 divides the resultant sum by the total number "n" of the cylinders to get an average difference "dneave".

A step S509 following the step S508 calculates a roughness value from the calculated difference "dne" and the average difference "dneave" according to the following equation.

$$\text{roughness value} = \Sigma(dneave - dne)^2 \qquad (2)$$

The roughness value indicates a condition of the burning of an air-fuel mixture in the engine 1. After the step S509, the current execution cycle of the program segment ends.

As previously mentioned, maximum and minimum values of the rotational engine speed are detected. The condition of the burning of the air-fuel mixture is detected on the basis of the detected maximum and minimum values. Timings for the detection of the maximum and minimum values are set in response to the spark timing. This design provides accurate detection of the burning condition.

The burning condition may be detected on the basis of the pressure within a cylinder of the engine 1. In this case, the start timing of the detection of the in-cylinder pressure is set in response to the spark timing by referring to a predetermined map. The start timing of the detection of the rotational engine speed Ne or the start timing of the detection of the in-cylinder pressure may be set in response to the timing at which an outlet valve 12 is opened.

Fourth Embodiment

A fourth embodiment of this invention is similar to the first embodiment thereof except for design changes mentioned hereafter.

Figure 16:
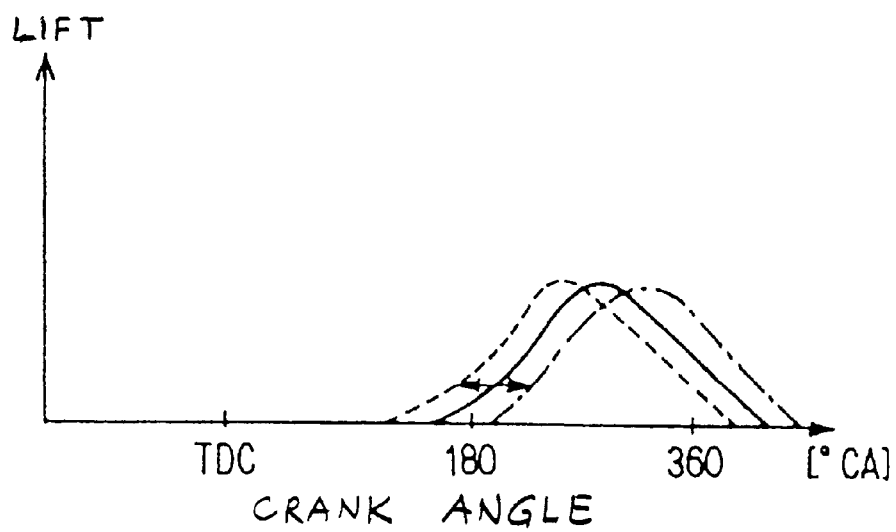
FIG. 16 is a diagram of the relation between the crank angle and the lift of an outlet valve.

As shown in FIG. 16, the lift of an outlet valve 12 varies in accordance with the crank angle. The timing at which the outlet valve 12 is opened is changed in response to operating conditions of an engine 1. The timing at which exhaust gas is discharged from a combustion chamber 10 into an exhaust pipe 3 changes in accordance with the outlet-valve opening timing. Thus, the phase of a variation in the pressure within the combustion chamber 10 (the pressure within the cylinder) and the phase of a variation in the rotational engine speed shift as the outlet-valve opening timing is changed.

Figure 17:
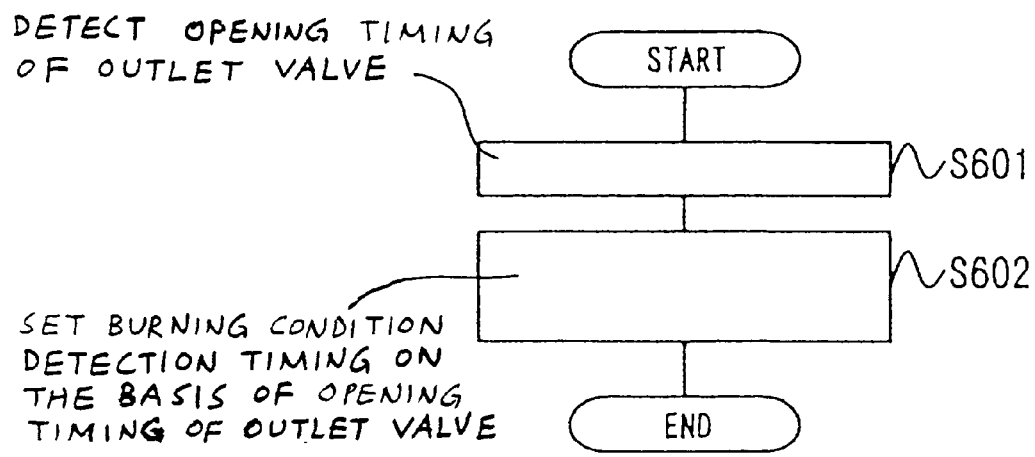
FIG. 17 is a flowchart of a segment of a program for an ECU in a fourth embodiment of this invention.

FIG. 17 is a flowchart of a segment (a subroutine) of a program for an ECU 30 in the fourth embodiment of this invention. The program segment in FIG. 17 is repetitively executed.

As shown in FIG. 17, a first step S601 of the program segment detects a timing at which the outlet valve 12 is opened.

A step S602 following the step S601 sets a detection timing in response to the detected outlet-valve opening timing. The detection timing means a timing at which a condition of the burning of an air-fuel mixture is detected. A parameter for the detection of the burning condition uses, for example, the rotational engine speed Ne. In the case where an in-cylinder pressure sensor is provided, the parameter for the detection of the burning condition may use the in-cylinder pressure. After the step S602, the current execution cycle of the program segment ends.

Figure 18:
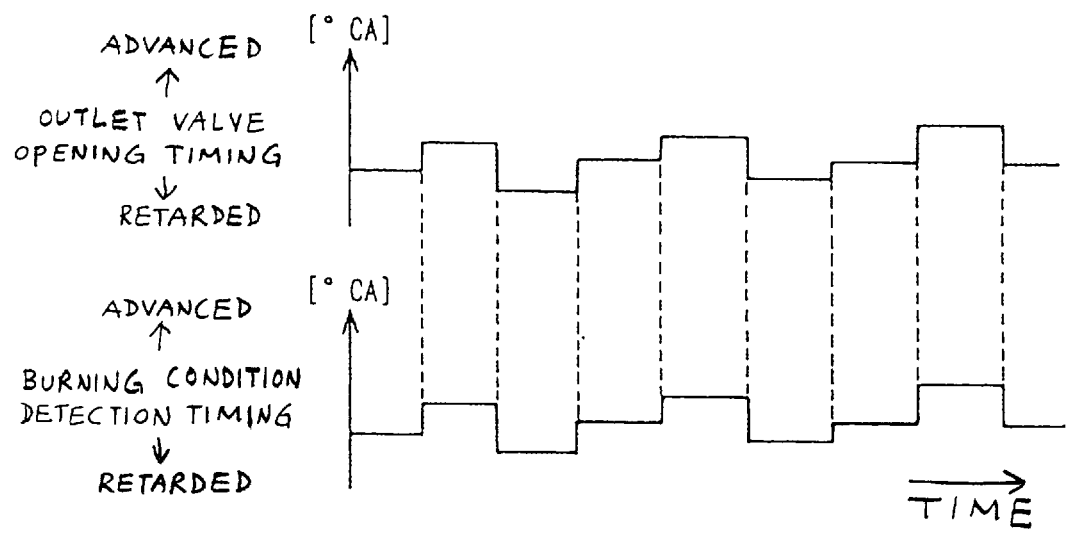
FIG. 18 is a time-domain diagram of the outlet-valve opening timing and the burning condition detection timing.

As shown in FIG. 18, changes in the burning condition detection timing are synchronized with changes in the timing at which the outlet valve 12 is opened. Therefore, changes in the timing of the detection of the rotational engine speed or the in-cylinder pressure are synchronized with the outlet-valve opening timing.

As previously mentioned, the step S602 in FIG. 17 sets the burning condition detection timing in response to the outlet-valve opening timing. The condition of the burning of the air-fuel mixture is detected at the timing set by the step S602. The detected burning condition is used in controlling the air-to-fuel ratio of the air-fuel mixture.

Fifth Embodiment

A fifth embodiment of this invention is similar to the first embodiment thereof except for design changes mentioned hereafter. The crank angle intervals between the points of repetitive detection of the rotational engine speed in the fifth embodiment of this invention are shorter than those in the first embodiment thereof. Thus, the crank angle intervals between the points of repetitive detection of the burning condition in the fifth embodiment of this invention are shorter than those in the first embodiment thereof.

Figure 19:
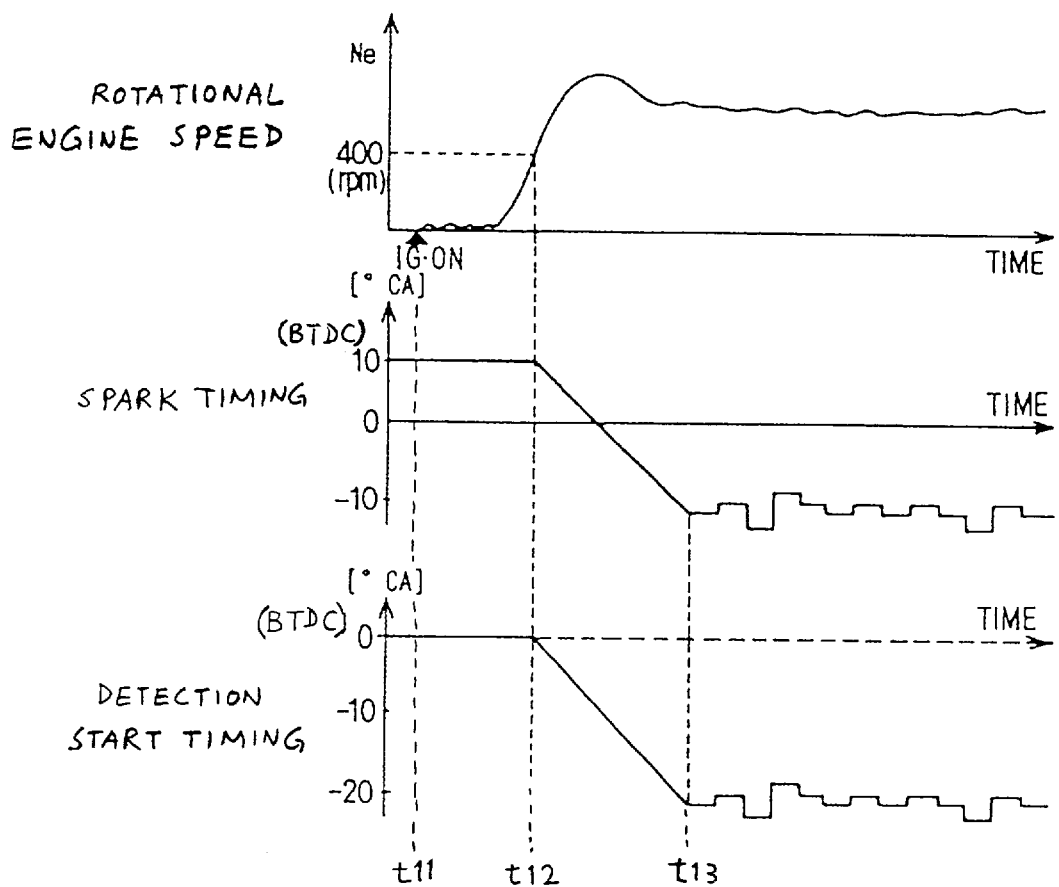
FIG. 19 is a time-domain diagram of the rotational engine speed, the spark timing, and the timing of the detection of the rotational engine speed in a fifth embodiment of this invention.

With reference to FIG. 19, the ignition switch is changed to its on position at a moment t11 under conditions where the engine 1 is cold. After the change of the ignition switch to its on position (after the moment t11), the rotational engine speed basically increases. At a moment t12 following the moment t11, the rotational engine speed exceeds 400 rpm, and hence it is determined that the engine 1 has been started from a self-sustaining viewpoint. During the time interval between the moments t11 and t12, the spark timing is held equal to a prescribed timing, for example, an MBT-based timing. During the time interval between the moments t11 and t12, the start timing of the detection of the rotational engine speed (that is, the start timing of the detection of the burning condition) is also held equal to a given timing. After the moment t12, the spark timing is retarded from the prescribed timing toward a desired timing (determined by the spark-timing retarding control) in accordance with the lapse of time. After the moment t12, the start timing of the detection of the rotational engine speed (that is, the start timing of the detection of the burning condition) is retarded from the given timing in accordance with the movement of the spark timing. At a moment t13 following the moment t12, the spark timing reaches the desired timing. After the moment t13, the spark timing is adjusted by the spark-timing retarding control which responds to the load on the engine 1, and which is designed for accelerating the activation of the upstream catalytic converter 13. After the moment t13, the start timing of the detection of the rotational engine speed (that is, the start timing of the detection of the burning condition) is adjusted in accordance with the spark timing.

What is claimed is:

1. An apparatus for detecting a condition of the burning in an internal combustion engine, comprising:

burning-parameter controlling means for controlling a burning parameter operating on the burning in the internal combustion engine; and burning-condition detecting means for, in cases where the burning parameter is changed by the burning-parameter controlling means, sampling prescribed information for detecting a burning condition.

2. An apparatus as recited in claim 1, further comprising a spark plug, wherein the burning parameter is a spark timing at which the spark plug generates a spark, and the burning-parameter controlling means comprises spark-timing controlling means for driving the spark plug to control the spark timing.

3. An apparatus as recited in claim 1, further comprising a valve-timing varying mechanism, wherein the burning parameter is a timing at which an outlet valve is opened, and the burning-parameter controlling means comprises valve controlling means for controlling the timing at which the outlet valve is opened.

4. An apparatus as recited in claim 1, further comprising rotational-speed detecting means for sampling information related to a rotational speed of the internal combustion engine, wherein the burning-condition detecting means comprises means for sampling the information related to the rotational speed of the internal combustion engine at a prescribed timing and in response to the burning parameter, and means for detecting the burning condition in response to the sampled information related to the rotational speed of the internal combustion engine.

5. An apparatus as recited in claim 1, further comprising in-cylinder pressure detecting means for sampling information related to a pressure within a cylinder of the internal combustion engine, wherein the burning-condition detecting means comprises means for sampling the information related to the pressure within the cylinder of the internal combustion engine at a prescribed timing and in response to the burning parameter, and means for detecting the burning condition in response to the sampled information related to the pressure within the cylinder of the internal combustion engine.

6. An apparatus as recited in claim 4, further comprising difference calculating means for calculating a rotational speed difference on the basis of the rotational speed detected by the rotational-speed detecting means, and reference-value calculating means for calculating a reference value of the burning condition on the basis of the rotational speeds of respective cylinders of the internal combustion engine which are detected by the rotational-speed detecting means, wherein the burning-condition detecting means comprises means for detecting the burning condition in response to the reference value calculated by the reference-value calculating means and the rotational speed difference between successive cylinders of the internal combustion engine which are calculated by the difference calculating means.

7. An apparatus as recited in claim 6, wherein the rotational speed difference calculated by the difference calculating means is equal to a difference between a minimum rotational speed and a maximum rotational speed detected by the rotational-speed detecting means in one combustion cycle.

8. An apparatus as recited in claim 1, wherein the burning-condition detecting means executes detecting the burning condition only in a given time interval after the internal combustion engine is started.

9. An apparatus as recited in claim 1, further comprising an air-to-fuel ratio sensor for detecting an air-to-fuel ratio of an air-fuel mixture in the internal combustion engine, wherein the burning-condition detecting means executes detecting the burning condition only in a given time interval from a moment of start of the internal combustion engine to a moment of activation of the air-to-fuel ratio sensor.

10. An apparatus as recited in claim 1, further comprising means for controlling an air-to-fuel ratio of an air-fuel mixture in the internal combustion engine in response to the burning condition detected by the burning-condition detecting means.

11. An apparatus for detecting a condition of the burning in an internal combustion engine in which a spark timing is variable, the apparatus comprising:

first means for detecting a timing of a latest spark in the engine;

second means for detecting a rotational speed of the engine at a timing which depends on the latest-spark timing detected by the first means; and third means for detecting a condition of the burning in the engine in response to the rotational speed detected by the second means.

12. An apparatus for detecting a condition of the burning in an internal combustion engine in which a spark timing is variable, the apparatus comprising:

first means for detecting a timing of every spark in the engine;

second means for detecting a rotational speed of the engine at a timing depending on the timing of every spark which is detected by the first means;

third means for inhibiting the second means from detecting a rotational speed of the engine twice or more with respect to the timing of every spark which is detected by the first means; and fourth means for detecting a condition of the burning in the engine in response to the rotational speed detected by the second means.

* * * * *